Nov. 10, 1942.    H. T. SMITH    2,301,338

APPARATUS FOR MAKING TUBING

Filed Feb. 4, 1941

INVENTOR
Hubert T. Smith
BY Lester G. Bradley
ATTORNEY

Patented Nov. 10, 1942

2,301,338

UNITED STATES PATENT OFFICE 2,301,338

APPARATUS FOR MAKING TUBING

Hubert T. Smith, St. Clair Shores, Mich., assignor to United States Rubber Company, New York, N. Y., a corporation of New Jersey Application February 4, 1941, Serial No. 77,321

1 Claim. (Cl. 18—30)

This invention relates to the manufacture of rubber tubing and particularly to the manufacture of bushings by an injection method. More particularly, the invention relates to the manufacture of relatively long lengths of tubular stock of uniform wall characteristics.

Heretofore rubber tubing has been produced by several different methods, such extruding plastic material from a tubing machine or by placing a quantity thereof in a conventional split mold having a removable central core.

A number of disadvantages have been experienced when using these earlier methods. For example, in the extrusion process, difficulties have been encountered in producing bushings of uniform cross-sectional dimensions throughout the length thereof. The tubular plastic form, when so extruded, had to be placed over a mandrel, wrapped with a suitable fabric material and then subjected to a vulcanizing process. This procedure resulted in irregularities upon the outer surface of the bushing, necessitating a grinding operation to obtain the desired dimension; and this added materially to the cost of manufacture of the bushings.

On the other hand in the process using conventional split molds for forming quantities of rubber bushings considerable labor and equipment was involved, and the operation was slow and expensive. This latter molding method also had the disadvantage of producing "flash" or overflow on the vulcanized bushing, and thus additional trimming operations were required to produce a finished article; all of which added to the cost of manufacture of the bushings.

The process of producing rubber bushings by the injection method of this invention has substantially eliminated the objectionable conditions mentioned above and has resulted in producing a type of rubber bushings which are very accurately formed and which are highly desired and acceptable to the market.

One object of my invention is to provide a bushing meeting close dimensional tolerances of concentricity of inside and outside surfaces. A further object is to lower the cost of manufacturing such articles by reducing the manual labor involved and holding to a minimum the amount of waste material resulting therefrom by eliminating the necessity for grinding and overflow trimming operations. Other objects are to avoid the formation of air pockets in the wall of the tube or bushing which would result in inefficient service; to produce a rubber tube or bushing with wall surfaces having a highly polished finish, adding to the outward appearance of the article; and to produce lengths of tubular material of approximately three feet which may be readily cut to shorter lengths.

The invention and its objects and advantages will be more clearly understood when read in connection with the accompanying drawing, in which.

Figure 1:
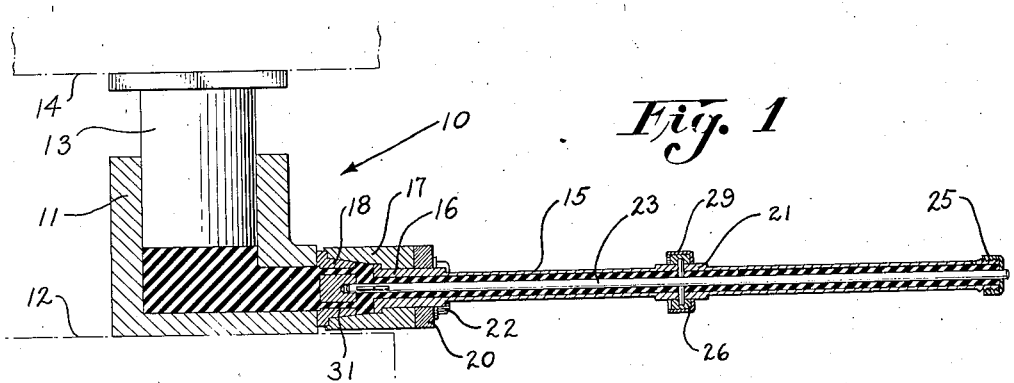
Fig. 1 is a longitudinal vertical sectional view of an injection head and cooperating tube-forming apparatus embodying my invention.
Figure 2:
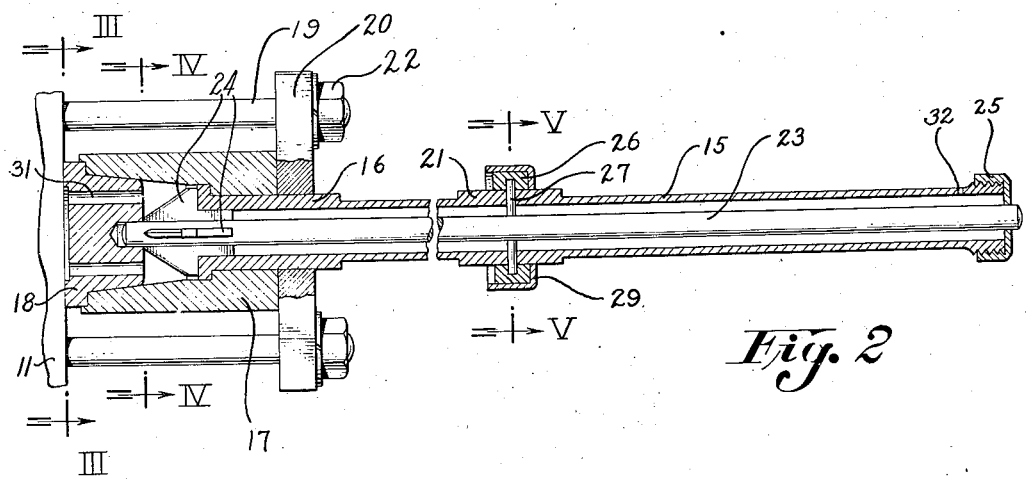
Fig. 2 is an enlarged horizontal view, partly in section, of the tube-forming apparatus of Fig. 1.
Figure 3:
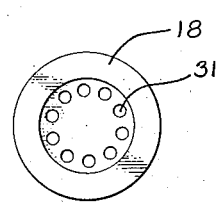
Fig. 3 is an end view, taken along section line III—III of Fig. 2, of a strainer member forming part of my invention.
Figure 4:
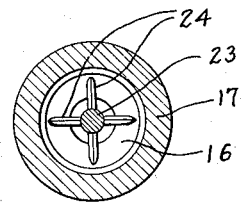
Fig. 4 is a transverse cross-sectional view taken along section line IV—IV of Fig. 2 and illustrating the inlet end of the tube-forming apparatus.

Referring to the drawing in detail and, in particular to Fig. 1, I show a conventional injection device 10 comprising a substantially cylindrical housing 11 positioned upon a supporting surface 12. The housing 11 is adapted to receive a cylinder or piston 13 which is caused to move downwardly by the action of a hydraulic press, a lower portion of which is designated generally by the dot-and-dash line 14. The lower end of the cylindrical housing 11 is provided with an outlet which is constructed and arranged to permit the installation of a tube-forming device thereon. This device essentially comprises a length of steel tubing 15 having a wall 16 of increased thickness in the region adjacent the inlet end thereof. A sleeve 17 engages a flange upon the end of the wall 16 and extends beyond the inlet end of the tube 15. The aperture in the end of the sleeve 17 is tapered to cooperate with a corresponding tapered surface upon a strainer member 18, the outside face of which engages a projecting portion forming the outlet of the cylindrical housing 11. The assembly is rigidly secured to the cylinder housing 11 by means of clamping bolts 19 secured to a cross member 20 by means of nuts 22 (Fig. 2).

Retained within the steel tubing 15 is a length of steel rod 23, the purpose of which is to act as a core or bore forming member. It is essential that the steel rod 23 be positioned in concentric relationship with the inside wall surface of the steel tube 15, and this is accomplished by providing a plurality of fins 24 rigidly and radially secured to the inlet end of the steel rod 23. The fins 24 are shaped to engage the inside surface and an end surface of the steel tube 15, thus positioning one end of the steel rod accurately centrally with respect to the tube 15. The opposite end of the steel rod 23 passes through a centrally located aperture in a cap member 25 which is assembled in threaded engagement with the open end of the steel tube 15.

Figure 5:
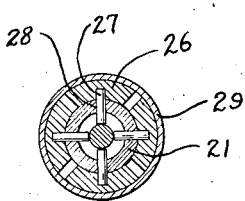
Fig. 5 is a transverse cross-sectional view taken along section line V—V of Fig. 2 and depicting the retractable centering pins.
Figure 6:
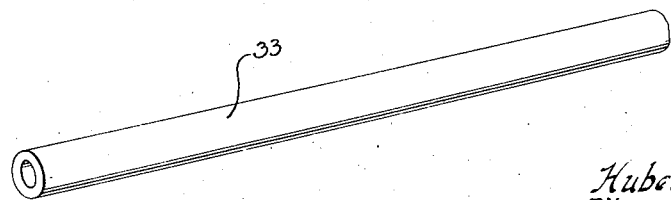
Fig. 6 is a perspective view of a portion of a finished rubber tubing.

The injection method employed in the invention for forming tubing necessitates the application of high pressures, due to the force required to pass the plastic material through a restricted area of extended length. Correspondingly, the equipment used must of necessity be capable of withstanding such high pressure. In forming a bushing having a small internal aperture or bore, the diameter of the core member is correspondingly small and the high pressure involved sometimes tends to bend the core member when only supported at its opposite ends, resulting in irregular wall thicknesses in the bushing. To overcome this difficulty, I provide means whereby the steel rod 23 is supported intermediate its ends in a manner to prevent its displacement by the action of the plastic material being forced into the steel tube 15. Positioned on an enlarged portion 21 of the steel tube 15 and midway of the tube length is a plurality of segments 26 (Fig. 2 and Fig. 5) which lie circumferentially adjacent the enlarged portion 21. Each of these segments 26 has a pin 27 rigidly secured to and projecting radially inwardly from the inner surface of the segment. The pins 27 slidably engage and extend through apertures 28 located in the enlarged portion 21 of the steel tube 15. When the segments 26 are in operative position in the apertures 28, a retaining ring 29 is slipped axially of the tube 15 and over the outer surfaces of these segments, thus positioning the segments in tight engagement with the steel tube 15. The pins 27 are of uniform length and extend into the interior of the tube to engage the periphery of the steel rod 23, thus supporting the rod against any forces tending to disturb its axial alignment within the steel tube 15.

In preparing the assembly for operation, the interior of the steel tube 15 and the surface of the steel rod 23 is thoroughly cleaned and coated with a lubricating material such as graphite. A predetermined quantity of rubber composition, or other plastic material, which has been reduced to the desired plasticity by warming mills or other heating means is inserted in the housing 11. The piston 13 is placed on top of the plastic material and a high pressure is applied thereto, forcing the material through a plurality of openings 31 extending through the strainer member 18. The purpose of the openings 31 in the strainer 18 is to distribute the pressure of the rubber more evenly as it enters the steel tube 15 and the fins 24 on the end of the steel rod 23 also function for a similar purpose. It is essential that the pressure of the plastic material within the steel tube 15 be uniform, as uneven pressures tend to form air pockets and improperly filled portions, causing failure of the bushing in service.

When the cavity is completely filled, a small air exhaust opening 32, located adjacent the end opposite the inlet end of the steel tube 15, permits a small amount of the plastic material to be discharged therefrom. The hydraulic press which operates the piston 13 is then shut off, the retaining ring 29 slipped aside, and the segments 26 carrying the pins 27 removed from the tube. As the segments 26 are removed the pins 27 are withdrawn from the rubber composition within the tube, and the spaces in the rubber composition previously occupied by the pins are filled by the rubber composition which flows into the spaces by reason of the pressure already imparted to the composition. After the pins have been removed, the loaded tube is disconnected from the housing 11 and the unit is then placed in a conventional heated chamber where the rubber composition is vulcanized; thereafter the vulcanized tubular member 33 is removed from the forming assembly.

The finished product is characterized by its highly polished surface and uniform wall thickness and no further finishing operation is required other than cutting it to proper lengths, as desired. By this method and apparatus it is possible to obtain relatively long lengths of tubular rubber composition in which the thickness of the wall is controlled within accurate limits.

While I have shown and described a preferred embodiment of my invention, it will be understood that modifications may be made without departing from the spirit of the invention or the scope of the appended claim.

Having thus shown and described my invention, what I claim and desire to protect by Letters Patent is:

An apparatus for forming lengths of tubular stock comprising a tubular member, a core member co-axially positioned within the tubular member and supported at each end of the tubular member, a plurality of retractable pins located intermediate the ends of the tubular member and extending therethrough and operatively engaging the core member for maintaining a positive concentric relationship between the core and tubular members, a retaining ring surrounding the tubular member and axially slidable therealong to a position for engaging and maintaining the retractable pins in contact engagement with the core member, and means for injecting a plastic composition into the tubular member.

HUBERT T. SMITH.

CERTIFICATE OF CORRECTION.

Patent No. 2,301,338. November 10, 1942.

HUBERT T. SMITH.

It is hereby certified that error appears in the above numbered patent requiring correction as follows: In the heading to the printed specification, line 6, for the serial number "77,321" read --377,321--; and that the said Letters Patent should be read with this correction therein that the same may conform to the record of the case in the Patent Office.

Signed and sealed this 29th day of December, A. D. 1942.

(Seal)

Henry Van Arsdale,
Acting Commissioner of Patents.